(12) United States Patent  (10) Patent No.: US 9,010,624 B2
Kerscher et al.  (45) Date of Patent: Apr. 21, 2015

(54) METHOD IN WHICH A MOBILE PHONE READS A BAR CODE LOCATED ON A DEFECTIVE DOMESTIC APPLIANCE AND IS AUTOMATICALLY CONNECTED TO CUSTOMER SERVICE

(75) Inventors: Melanie Kerscher, Taufkirchen/Vils (DE); Thomas Schraufstetter, Erding (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 152 days.

(21) Appl. No.: 13/809,608

(22) PCT Filed: Jun. 30, 2011

(86) PCT No.: PCT/EP2011/060992
§ 371 (c)(1),
(2), (4) Date: Mar. 27, 2013

(87) PCT Pub. No.: WO2012/007286
PCT Pub. Date: Jan. 19, 2012

(65) Prior Publication Data
US 2013/0193204 A1 Aug. 1, 2013

(30) Foreign Application Priority Data

Jul. 13, 2010 (DE) .......................... 10 2010 031 283

(51) Int. Cl.
*G06F 17/00* (2006.01)
*G06Q 30/00* (2012.01)
*H04M 1/725* (2006.01)

(52) U.S. Cl.
CPC ......... *G06Q 30/016* (2013.01); *H04M 1/72522* (2013.01); *H04M 1/7253* (2013.01); *H04M 2250/52* (2013.01)

(58) Field of Classification Search
USPC .................................. 235/375, 472.02; 705/1
See application file for complete search history.

(56) References Cited

U.S. PATENT DOCUMENTS 5,778,314 A 7/1998 Sudo et al.
7,191,950 B1 * 3/2007 Petrovich et al. ........ 235/472.02
(Continued)

FOREIGN PATENT DOCUMENTS

CN 101316408 A 12/2008
CN 201210300 Y 3/2009
(Continued)

OTHER PUBLICATIONS

Report of Examination CN 201180034387 dated Jul. 2, 2014.
(Continued)

*Primary Examiner* — Daniel Hess
(74) *Attorney, Agent, or Firm* — James E. Howard; Andre Pallapies

(57) ABSTRACT

A method for supporting an operator of a household appliance, in particular a domestic appliance, by making contact with customer service for the household appliance with the aid of a portable communication device is disclosed. A machine-readable code affixed to the household appliance, in particular the domestic appliance, is detected by an optical detection device of the portable communication device. On the basis of the detected code, a communication link is established between the portable communication device and communication equipment of customer service, specifically automatically via the portable communication device.

20 Claims, 1 Drawing Sheet

(56) References Cited

U.S. PATENT DOCUMENTS

| | | | |
|---|---|---|---|
| 2001/0047270 A1* | 11/2001 | Gusick et al. | 705/1 |
| 2005/0139674 A1 | 6/2005 | Ishibashi et al. | |
| 2006/0056707 A1 | 3/2006 | Suomela et al. | |
| 2006/0123041 A1 | 6/2006 | Sandrini et al. | |
| 2009/0156193 A1 | 6/2009 | Urbanija et al. | |

FOREIGN PATENT DOCUMENTS

| | | |
|---|---|---|
| DE | 102005049811 A1 | 4/2007 |
| GB | 2246491 A | 1/1992 |
| GB | 2359956 A | 9/2001 |
| JP | 2004208256 A | 7/2004 |
| JP | 2007034366 A | 2/2007 |
| JP | 2008090704 A | 4/2008 |
| KR | 20100019313 A | 2/2010 |
| TW | 200921412 A | 5/2009 |

OTHER PUBLICATIONS

PixelPark AG: Whitepaper—Mobile Tagging mit 2D-Barcodes. Berlin, Germany, Jul. 17, 2007.

GARMIN: Samsung Mobile Navigator—Quick Start Manual. Feb. 2008, Southampton, Hampshire.

International Search Report PCT/EP2011/060992 dates Sep. 22, 2011.

Report of Examination DE 10 2010 031 283.5 dated Mar. 25, 2011.

\* cited by examiner

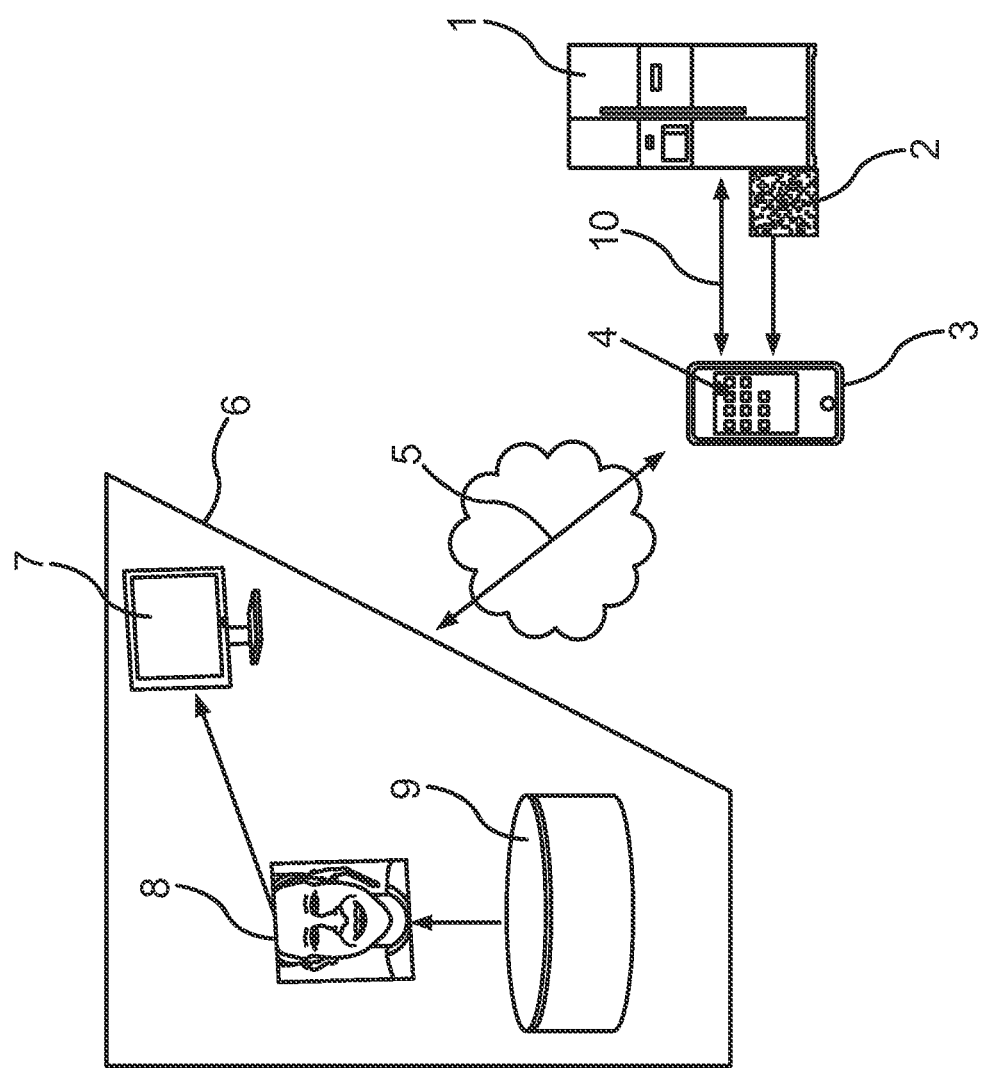

METHOD IN WHICH A MOBILE PHONE READS A BAR CODE LOCATED ON A DEFECTIVE DOMESTIC APPLIANCE AND IS AUTOMATICALLY CONNECTED TO CUSTOMER SERVICE

BACKGROUND OF THE INVENTION

The invention relates to a method for assisting an operator of a household appliance, in particular a domestic appliance, when making contact with a customer service department for the household appliance with the aid of a portable communications device. The invention also relates to a portable communications device as well as to a system with a portable communications device and a household appliance, in particular a domestic appliance.

Interest here focuses in particular on the automatic setting-up of a communications link between a portable communications device—for example a mobile phone, a portable personal computer (e.g. personal digital assistant) or the like—of the user of a household appliance and an external communications facility of a customer service department or one which is remote from the household appliance. It is known that the operator of a household appliance can make contact with the customer service department, for example if the household appliance is defective. For example the operator can call the customer service department or send a message to the customer service department, for example via the Internet. However the operator does not always have customer service department contact data to hand; it is frequently necessary to search for such contact data and this takes time. Also it is often problematic for the operator to describe the problem that has occurred. The customer service department is not always given an accurate picture of the observed problem and is therefore not always accurately informed of what is actually defective.

BRIEF SUMMARY OF THE INVENTION

The object of the invention is to show how an operator of a household appliance, in particular a domestic appliance, can make contact with a customer service department in a simple manner.

According to the invention this object is achieved by a method with the features of the invention, a portable communication device with the features of the invention and a system with the features of the invention. Advantageous embodiments of the invention are the subject matter of the dependent claims and the description.

In an inventive method an operator of a household appliance, in particular a domestic appliance, is assisted when making contact with a customer service department for the household appliance with the aid of a portable communications device. A code affixed to the household appliance is detected by an optical detection facility of the portable communications device. A communications link to a communications facility of the customer service department is set up by the portable communications device on the basis of the detected code.

The inventive effect is therefore achieved in that a machine-readable code, which is affixed to the household appliance and can be read opto-electronically, is scanned by the portable communications device and the communications link to the customer service department is established automatically by the portable communications device on the basis of said code. The invention has various advantages. For example the operator does not have to search for the customer service department contact data, which takes time, before then contacting the customer service department. The operator only has to scan the code affixed to the household appliance, specifically with the aid of the portable communications device, and can then be connected to the customer service department. The operator can now describe the fault that may have occurred in the household appliance in more detail to the customer service department and can eliminate it him/herself according to instructions from trained personnel or can agree an appointment for an engineer's visit. The operator is thus able to contact the customer service department easily, without having to know the necessary customer service department contact data.

A household appliance here refers in particular to a domestic appliance, in other words an appliance used for domestic purposes. It can be a large domestic appliance, for example a washing machine, tumble dryer, dishwasher, cooking appliance, extractor hood, refrigeration appliance, combined fridge/freezer or an air conditioning appliance. It can however also be a small domestic appliance such as a vacuum cleaner, automatic coffee machine or food processor.

The portable communications device refers in particular to a mobile terminal, by means of which the operator can telephone and/or transmit data via the internet. The portable communications device can be for example a mobile phone or a portable or mobile personal computer.

The communications link is preferably set up via the internet so that data can be transmitted between the portable communications device and the communications facility of the customer service department via the internet. The communications link can be a bi-directional link, by way of which data can be sent both from the portable communications device to the communications facility of the customer service department and in the converse direction. A communications link via the internet allows data to be transmitted at a fast rate. It is thus possible also to transmit video data between the portable communications device and the communications facility of the customer service department.

The communications link can be set up directly or once a predetermined criterion has been met—in particular in respect of an operator input—on the basis of the detected code. This means that the communications link can be set up automatically directly after code detection or only once the predetermined criterion has been met. This predetermined criterion can include the condition that the setting-up of the communications link is approved by the operator. The portable communications device can therefore receive an input—which the operator performs with the aid of an input facility of the communications device—by way of which the operator approves the setting-up of the communications link. Such a procedure is particularly user-friendly. Once the code has been scanned, the operator is asked by the portable communications device whether or not the communications link to the customer service department should actually be established. The operator can then confirm and approve or reject the setting-up of the communications link. This avoids situations in which the communications link is established against the operator's will.

The code is detected with the aid of the optical detection facility of the portable communications device. The code is therefore an opto-electronically readable code or an opto-electronically readable—machine-readable—character. The optical detection facility can be a digital camera of the portable communications device for example. The scanning of barcodes with the aid of a digital camera of a portable communications device is already known from the prior art, specifically from the German patent application DE 10 2005 049

811 A1. The code can thus be detected in the manner described in the subject matter of publication DE 10 2005 049 811 A1. However provision can alternatively be made for the code to be scanned with the aid of an optical detection facility comprising a plurality of illuminating means—in particular LEDs—and a plurality of light detectors. The code can then be illuminated with the aid of the illuminating means and the reflected light can be detected by the light detectors.

In principle only audio data or voice signals can be transmitted by way of the communications link between the portable communications device and the communications facility of the customer service department, so that the operator can communicate with the customer service department by means of voice signals. However it has proven particularly advantageous for both audio data or voice signals and video data or image signals to be transmitted between the portable communications device and the communications facility of the customer service department by way of the communications link. For example video data recorded by a digital camera of the portable communications device and/or video data recorded by a digital camera connected to the communications facility of the customer service department can be transmitted between the portable communications device and the communications facility of the customer service department. This allows an optical link also to be established between the operator or the environment of the portable communications device and the customer service department personnel, so that a wide range of further optical information can be transmitted in addition to voice signals. This also allows an actual optical image of the possibly defective household appliance to be conveyed to customer service department personnel and customer service department personnel can acquire more information about the possible problems. A fault in the household appliance can thus be eliminated more rapidly in some instances, possibly even without an engineer's visit. The transmission of image data between the portable communications device and the communications facility of the customer service department has proven particularly advantageous in particular for faults in the household appliance that can be detected by optical means. These could be defective pushbuttons on an operating facility of the household appliance for example.

In order to be able to transmit audio data and/or video data between the portable communications device and the communications facility of the customer service department, corresponding software is preferably installed on the portable communications device. Such computer programs, which allow a data transmission of audio data and video data via the Internet are already known from the prior art. Software such as that available from www.bambuser.com can be used for example.

As mentioned above, the code is in particular an optoelectronically readable code, which can be scanned with the aid of an optical detection facility. The code can be for example a one-dimensional code—such as a barcode—or a two-dimensional code, such as a matrix code for example. Such a machine-readable code can be affixed for example to an end face or side wall of the household appliance, so that it is accessible for detection using the portable communications device. If a two-dimensional code is used, it can contain much more information than a one-dimensional code. Two-dimensional codes are technically superior to one-dimensional or linear codes, as they can hold much more information and are much less susceptible to data corruption. Using a two-dimensional code therefore allows a lot of information to be encoded using a single code.

The code affixed to the domestic appliance can contain a very wide range of information. First the code can contain information which forms the basis for establishing the communications link. Like a control command, this information therefore prompts the portable communications device to set up the communications link to the communications facility of the customer service department. However the code can also contain further information, specifically for example an identifier of the household appliance and/or a communications number, which allows the communications link to the communications facility of the customer service department to be set up. The identifier of the household appliance can be for example a specific serial number, which uniquely identifies this individual household appliance. Such a number is in particular appliance-specific and therefore distinguishes this individual appliance item from other household appliances. The communications number can be for example the customer service department telephone number or the IP address of the communications facility of the customer service department. It is thus possible to supply an information-rich code, which contains a wide range of useful information.

Once the communications link has been set up, it is also possible to transmit data including at least one information item contained in the code from the portable communications device to the communications facility of the customer service department. For example data comprising the identifier of the household appliance can be transmitted by way of the communications link to the communications facility of the customer service department. The portable communications device can thus detect the necessary appliance data—e.g. its serial number—on the basis of the code and transmit it to the communications facility of the customer service department. Customer service department personnel can then call up the data assigned to the household appliance from a database, thereby acquiring more accurate information about the type of household appliance and its components, without having to trouble the customer with difficult questions about the household appliance. Customer service department personnel can also call up customer-specific information from the database. Customer service department personnel can thus deal with the customer's specific requirements. The use of a CRM (customer relationship management) database here allows fast access to all the customer's data. A well-managed CRM database allows the customer to be addressed and advised quickly and individually. Communication between the customer service department and the operator of the household appliance can thus proceed quickly and attentively.

If the portable communications device comprises a GPS (global positioning system) receiver, position data can also be transmitted by way of the communications link to the communications facility of the customer service department, including information about the current global position of the portable communications device. It is thus possible to locate the portable communications device and therefore the household appliance. Such transmission of communications data to the communications facility of the customer service department—like the setting-up of the communications link—can take place on condition that the operator approves it. The portable communications device can then receive an input from the operator, by way of which transmission of the position data is approved by the operator.

In one embodiment fault data recorded by the household appliance—for example by means of corresponding sensors—and stored in a memory of the household appliance is transmitted from a communications unit of the household appliance to the portable communications device in a wireless or wired manner. To this end the household appliance can have a communications interface, which can send and/or receive data for example according to the Bluetooth® standard and/or the WLAN (wireless local area network) standard. The fault data can contain information about any faults that may have occurred in the household appliance. The portable communications device can then transmit the fault data to the communications facility of the customer service department. Fault data recorded by the household appliance itself is then available to customer service department personnel for evaluation. Customer service department personnel can thus diagnose the fault in the household appliance in a simpler and easier manner. For example customer service department personnel can first make an initial diagnosis based on a (video) conversation with the customer and this can then be verified on the basis of the fault data from the household appliance.

An inventive portable communications device comprises an optical detection facility for detecting a code, as well as a control facility, which is designed to set up a communications link between the portable communications device and a communications facility of a customer service department on the basis of the detected code.

An inventive system comprises a portable communications device as well as a household appliance. Affixed to the household appliance is an opto-electronically readable code, which prompts the portable communications device to set up a communications link to a communications facility of a customer service department.

The preferred embodiments presented in relation to the inventive method and their advantages apply correspondingly to the inventive communications device and the inventive system.

BRIEF DESCRIPTION OF THE DRAWINGS

Further advantages of the invention will emerge from the claims, the FIGURE and the description of the FIGURE. All the features and feature combinations mentioned above in the description and those mentioned below in the description of the FIGURE and/or shown in the FIGURE alone can not only be used in the combination cited in each instance but also in other combinations or even alone.

DETAILED DESCRIPTION OF EXEMPLARY EMBODIMENTS OF THE PRESENT INVENTION

The invention is now described in more detail based on a preferred exemplary embodiment and with reference to the accompanying drawing. The single FIGURE shows a schematic diagram of an arrangement based on which a method according to one embodiment of the invention is described in more detail.

Present in a domestic situation is a household appliance 1, which in the exemplary embodiment is a combined fridge/freezer. Affixed to the household appliance 1 is a machine-readable or opto-electronically readable code 2. The code 2 can be for example a two-dimensional code, specifically a matrix code for example.

A portable communications device 3 is a mobile phone in the exemplary embodiment. The mobile phone 3 comprises a touch-sensitive display 4, which has both the function of a display facility and the function of an operating facility. The mobile phone 3 also comprises a digital camera (not shown in detail in the FIGURE). The digital camera is an optical detection facility, which can detect light in the spectral range perceptible to humans. The digital camera captures image data and transmits it to a control facility (not shown in the FIGURE) of the mobile phone 3. The control facility of the mobile phone 3 can process the recorded image data.

The mobile phone 3 is set up to detect the code 2 with the aid of the digital camera. The control facility of the mobile phone 3 can decode the encoded data of the code 2 and thus acquire and process the information contained in the code 2. To this end a computer program or software can be installed on the mobile phone 3 allowing the information contained in the code 2 to be acquired with the aid of an image processing algorithm.

The control facility of the mobile phone 3 can set up a communications link 5 to a customer service department 6 on the basis of the scanned code 2. More specifically the mobile phone 3 can establish the communications link 5 to a communications facility 7 of the customer service department 6. In the exemplary embodiment this communications link 5 is set up via the internet, so that data can be transmitted between the mobile phone 3 and the communications facility 7 at a fast rate.

The code 2 can contain a very wide range of information. First the code 2 comprises a control command, which prompts the mobile phone 3 or its control facility to set up the communications link 5. The code 2 can also contain information in the form of the identifier of the household appliance. This identifier can be present for example in the form of a serial number, which uniquely identifies the household appliance 1 and which distinguishes the household appliance 1 from other household appliances—even of the same type. The identifier is therefore a number that is specific to this individual household appliance 1. A communications number can also be encoded in the code 2, allowing the communications link 5 to the communications facility 7 to be set up. This communications number can be for example the IP address of the communications facility 7.

The communications facility 7 can be configured for example as a personal computer. A digital camera can also be connected to the communications facility 7, being able to record images of customer service department personnel 8 for example. The communications facility 7 is coupled to a database 9 and can call up data stored in the database 9. The database 9 can be a CRM database, which contains a wide range of customer-specific data, thereby allowing a customer to be addressed and advised quickly and individually, so that communication with the customer can proceed in a fast and attentive manner.

A method according to one embodiment of the invention is described in more detail below. An operator of the household appliance 1 ascertains a fault in the household appliance 1. The operator ascertains for example that pushbuttons or a display facility of the household appliance 1 is/are defective. The operator takes the mobile phone 3, activates the digital camera and records an image of the code 2. The control facility of the mobile phone 3 now receives image data including the imaged code 2. The control facility of the mobile phone 3 processes the image data and acquires the information set out above and contained in the code 2. The control facility of the mobile phone 3 now activates the touch-sensitive display 4 of the mobile phone 3 so that the operator is shown a question asking whether or not the communications link 5 is to be set up. The operator can now approve or reject the setting-up of the communications link 5 with the aid of the touch-sensitive display 4.

If the operator approves the setting-up of the communications link 5, it is established automatically by the control facility of the mobile phone 3. To this end software can be installed on the mobile phone 3, as known for example from the internet site www.bambuser.com.

The operator is thus connected to the customer service department 6 as it were automatically. A speakerphone facility of the mobile phone 3 is activated automatically in the process, so that the operator can make contact with customer service department personnel 8 and hold a conversation with said customer service department personnel 8. In addition to the voice signals, video data or video signals are also transmitted by way of the communications link 5. The communications facility 7 receives the image data recorded by the digital camera of the mobile phone 3, while the mobile phone 3 can optionally receive image data from the customer service department 6. Therefore images of customer service department personnel 8 can optionally be displayed on the touch-sensitive display 4, while customer service department personnel 8 are shown images recorded by the mobile phone 3. Customer service department personnel 8—personnel with a great deal of technical expertise—now make a first remote diagnosis on the basis of the conversation with the operator and on the basis of images. The best possible solution for the customer can now be sought with the assistance of the operator.

The information read out from the code 2 can also be transmitted to the customer service department 6 by the mobile phone 3. The mobile phone 3 can also transmit the identifier of the household appliance 1 to the customer service department 6. Customer service department personnel 8 can then access the database 9 and call up appliance-specific and/or customer-specific data. Customer service department personnel 8 thus obtain additional information relating to the household appliance 1, as well as to the customer.

The mobile phone 3 can also contain a GPS receiver. The global position of the mobile phone 3 is then known and the mobile phone 3 can transmit position data to the customer service department 6, giving the current global position of the mobile phone 3. Such a transmission of position data can also be initiated after approval by the operator. Customer service department personnel thus obtain information about the current position of the mobile phone 3 and can therefore locate the household appliance 1.

In one development of the method a communications link 10 is also set up between the mobile phone 3 and an appliance-side communications unit (not shown in the FIGURE). Fault data stored in a memory of the household appliance 1 can then be transmitted to the mobile phone 3 in a wireless or wired manner. The mobile phone 3 can then forward this fault data to the customer service department 6. Customer service department personnel 8 therefore receive additional information about the fault in the household appliance 1 and can therefore make a better diagnosis.

LIST OF REFERENCE CHARACTERS

1 Household appliance
2 Code
3 Mobile phone
4 Touch-sensitive display
5 Communications link
6 Customer service department
7 Communications facility
8 Customer service department personnel
9 Database
10 Communications link

The invention claimed is:

1. A method for assisting an operator of a household appliance when making contact with a customer service department for the household appliance with the aid of a portable communication device, the method comprising the steps of:
   detecting a code affixed to the household appliance with an optical detection device of the portable communication device,
   detecting an identifier of the household appliance from the detected code, setting up of a communication link between the portable communication device and a communication facility of the customer service department based on the detected code,
   transmitting data, which comprise the identifier of the household appliance, from the portable communication device to the communication facility of the customer service department via the communication link,
   transmitting fault data from a communication unit of the household appliance to the portable communication device, and
   transmitting the fault data from the portable communication device to the communication facility of the customer service department via the communication link.

2. The method of claim 1, wherein the communication link is set up once a predetermined criterion relating to an operator input has been met.

3. The method of claim 2, wherein the predetermined criterion includes input from the portable communication device indicating approval by the operator for setting-up of the communication link.

4. The method of claim 1, further comprising the step of transmitting audio data between the portable communication device and the communication facility of the customer service department via the communication link.

5. The method of claim 1, further comprising the step of transmitting video data selected from video data recorded by a digital camera of the portable communication device and video data recorded by a digital camera connected to the communication facility of the customer service department between the portable communication device and the communication facility of the customer service department via the communication link.

6. The method of claim 1, wherein the code affixed to the household appliance is a code selected from one-dimensional barcode and a two-dimensional matrix code.

7. The method of claim 1, wherein the detected code affixed to the household appliance is associated with a communication number, which allows the communication link to the communication facility of the customer service department to be set up.

8. The method as of claim 1, further comprising the step of transmitting position data including information about a current global position of the portable communication device to the communication facility of the customer service department via the communication link.

9. The method of claim 8, wherein the position data are transmitted to the communication facility of the customer service department on condition that the portable communication device receives an input, by way of which the operator approves transmission of the position data.

10. A system for assisting an operator of a household appliance, in particular a domestic appliance, to contact a customer service department for the household appliance, the system comprising:
   the household appliance having an opto-electronically readable code with information about an identifier of the household appliance, and
   a portable communication device comprising an optical detection device for detecting the code and a control device configured to set up a communication link between the portable communication device and a communication facility of the customer service department based on the detected code, to acquire from the code the identifier of the household appliance, and to transmit data comprising the identifier of the household appliance to the communication facility of the customer service department via the communication link,
wherein the household appliance comprises a communication unit for transmitting fault data from of the household appliance to the portable communication device for forwarding from the portable communication device to the communication facility of the customer service department via the communication link.

11. The system of claim 10, wherein the detected code affixed to the household appliance is associated with a communication number, which allows the communication link to the communication facility of the customer service department to be set up.

12. The system as of claim 10, further comprising the step of transmitting position data including information about a current global position of the portable communication device to the communication facility of the customer service department via the communication link.

13. A household appliance, in particular a domestic appliance, comprising:
   an opto-electronically readable code affixed to the household appliance with information about an identifier of the household appliance and a communication number, which allows a communication link to a communication facility of a customer service department to be set up,
   wherein the code affixed to the household appliance is detected with an optical detection device of a portable communication device and the identifier of the household appliance is detected from the detected code, and data comprising the identifier of the household appliance are transmitted from the portable communication device to the communication facility of the customer service department via the communication link, and
   the household appliance comprises a communication unit and fault data are transmitted from of the household appliance to the portable communication device and forwarded from the portable communication device to the communication facility of the customer service department via the communication link.

14. The household appliance of claim 13, wherein the communication link is set up once a predetermined criterion relating to an operator input has been met.

15. The household appliance of claim 14, wherein the predetermined criterion includes input from the portable communication device indicating approval by the operator for setting-up of the communication link.

16. The household appliance of claim 13, wherein audio data are transmitted between the portable communication device and the communication facility of the customer service department via the communication link.

17. The household appliance of claim 13, wherein video data selected from video data recorded by a digital camera of the portable communication device and video data recorded by a digital camera connected to the communication facility of the customer service department are transmitted between the portable communication device and the communication facility of the customer service department via the communication link.

18. The household appliance of claim 13, wherein the code affixed to the household appliance is a code selected from one-dimensional barcode and a two-dimensional matrix code.

19. The household appliance as of claim 13, wherein position data including information about a current global position of the portable communication device are transmitted to the communication facility of the customer service department via the communication link.

20. The household appliance of claim 19, wherein the position data are transmitted to the communication facility of the customer service department on condition that the portable communication device receives an input, by way of which the operator approves transmission of the position data.

* * * * *